(12) United States Patent
Jonkka et al.

(10) Patent No.: US 7,063,282 B2
(45) Date of Patent: Jun. 20, 2006

(54) COMMINUTING APPARATUS

(75) Inventors: Arvo Jonkka, Pori (FI); Antti Tohkala, Pori (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 11/198,335

(22) Filed: Aug. 8, 2005

(65) Prior Publication Data
US 2006/0006259 A1    Jan. 12, 2006

Related U.S. Application Data

(63) Continuation of application No. PCT/FI04/000513, filed on Sep. 3, 2004.

(30) Foreign Application Priority Data
Sep. 26, 2003    (FI) .................................. 20031392

(51) Int. Cl.
  *B02C 4/32*    (2006.01)
  *B02C 17/02*   (2006.01)
  *B23Q 15/00*   (2006.01)
  *B27C 1/00*    (2006.01)
(52) U.S. Cl. ........................... 241/36; 241/92; 144/356; 144/382; 144/176; 144/162.1
(58) Field of Classification Search ................ 241/36, 241/92; 144/356, 382, 176, 162.1
See application file for complete search history.

(56) References Cited

U.S. PATENT DOCUMENTS
3,545,510 A * 12/1970 Grant et al. ................. 144/373

FOREIGN PATENT DOCUMENTS
GB    2 129 138 A    5/1984

* cited by examiner

*Primary Examiner*—Faye Francis
(74) *Attorney, Agent, or Firm*—Buchanan Ingersoll PC

(57) ABSTRACT

The present invention concerns a chipping or crushing apparatus having a prominent speed of rotation and mass inertial moment. The main parts of the apparatus include a chipping disc or a rotor, a short circuit motor and a frequency converter connected to the circuit of the motor. From the chipping disc, respectively from the rotor or from the motor there is arranged a data connection of the speed of rotation to the frequency converter, and the frequency converter has been arranged to control the frequency of the motor current by means of said data so, that in a situation of peak load, when the motor load (torque M) has reached the nominal load, the frequency converter keeps the motor load at the nominal load by decreasing the frequency of the motor current. Thereby kinetic energy of the rotating components will be released for use in the peak loads corresponding to the decrease of the speed of rotation.

6 Claims, 5 Drawing Sheets

COMMINUTING APPARATUS

This is a continuation of International Application No. PCT/FI2004/000513, filed Sep. 3, 2004, that designates the United States of America, and claims priority under 35 U.S.C. § 119 for the filing of Finnish Patent Application No. 20031392 on Sep. 26, 2003.

Chip for the pulp industry is mainly produced by means of disc chippers, which have been developed for chipping of large timber quantities. Logs to be chipped especially in Europe are of various sizes, and due to big butt logs a large feeding mouth and a big chipping disc are required for the chipper. For achieving a high production volume, in addition, the present chippers are equipped with a big amount of knives, from 12 to 15 pcs.

Nominal speed of rotation typical for a chipper for large-scale production is 300 r/min. Although the speed of a relevant chipper is not adjustable, the actual speed of a chipper varies in the range of 200 to 400 r/min in dependency on the log size and quality. With a chip length of about 18 to 30 mm, a feed rate of logs from 0.8 to 2 m/s can be achieved.

Chippers referred to above operate well and consume from 1.5 to 2 kWh/m³ chipping energy, approximately. In general there are from 3 to 5 smaller logs to be chipped in the gap of the chipper, providing an adequate average production. In addition, a basic requirement for the chippers being used is the ability to chip a trunk with a diameter of 600–800 mm and a length of 3–6 meters. Power in the range of 3000–4000 kW is required for chipping of this kind of logs. This kind of a maximum performance lasting a few seconds is achieved by using one or several bigger short circuit motors designed for a "tipping moment factor" of about 2. As with the high-capacity motors the slip of the motor is small, the kinetic energy of the chipping disc cannot be noticeably utilized. A limited utilization (about 20%) of the kinetic energy of the chipping disc has been achieved by using a fluid coupling. Big fluid couplings, however, increase the production costs of the chipper and cause need of maintenance and loss of power.

Another problem in connection with said drive is the relatively long lasting and high current peaks built up in connection with load peaks. As a result of those, a considerable loading capacity will be required from the electric network that supplies the chipper. It has often occurred, that caused by the starting of the chipper and also as a result of big trunks being chipped, there are disturbances as a resulting effect in the area of the electric network of the distribution transformer in question.

A third problem in connection with the chipping is the variable properties of the wood to be chipped. This results in varying chip size and problems connected to the further processing thereof. In paper and pulp mills the changing of the chip size from ideal into the undesired direction is called "decrease in chip quality". Variation of quality is effected by seasons, drying of wood, growing circumstances and dimensions of the trees. The variation of chip quality can be compensated by changing the components of the chipper or by adjusting them in different positions. In the Nordic countries different chip lengths are used to compensate seasonal changes.

The mentioned measures are in many respects difficult to use in accordance with the rapidly changing process circumstances. Also the influence of the changes in the chipping speed on the chip size is well known. For example control of speed of big industrial chippers is so expensive due to the applied high power, that it is not used. Nowadays, however, the use of frequency converters has become general and cheaper, but still their use in the power range of 3000–4000 kW is considered to be too expensive with respect to the gained benefit.

The characteristic features of the chipping or crushing apparatus in accordance with the present invention are defined in the attached claim 1. The characteristic features of the chipper to be used for chipping wood are defined in the attached claim 3.

With the apparatus in accordance with the invention for instance the drive of the chipper and the speed regulation thereof will be provided with a prominently smaller power than earlier. When operating the chipper in accordance with the present invention, the power of the drive motors is designed for the medium production of the chipping line, considering a certain reserve, and the needed short-term chipping energy required for chipping of big logs will be received from the inertial mass of the drive system of the chipper. A prominent part of the inertial mass can be utilized in chipping big-sized logs by using in addition to the motor power of the chipper the kinetic energy loaded to the drive system by allowing the speed of the drive system to decrease momentary. The decreasing of the speed is controlled so that the increase of the motor current caused by the decrease of speed of rotation of the chipper controls the frequency of the current to be supplied to the drive motor so, that the torque given by the drive motor, after having reached a certain value, is constant with any frequency of the current. For implementing the invention, in addition to the chipping disc or crusher rotor included in the system already, additional inertial mass is preferably attached to the drive system, like in the form of a separate flywheel.

Embodiments of the present invention will be described as examples only with reference to the enclosed drawings, wherein FIG. 1 shows a chipper in accordance with the present invention.

Figure 4:
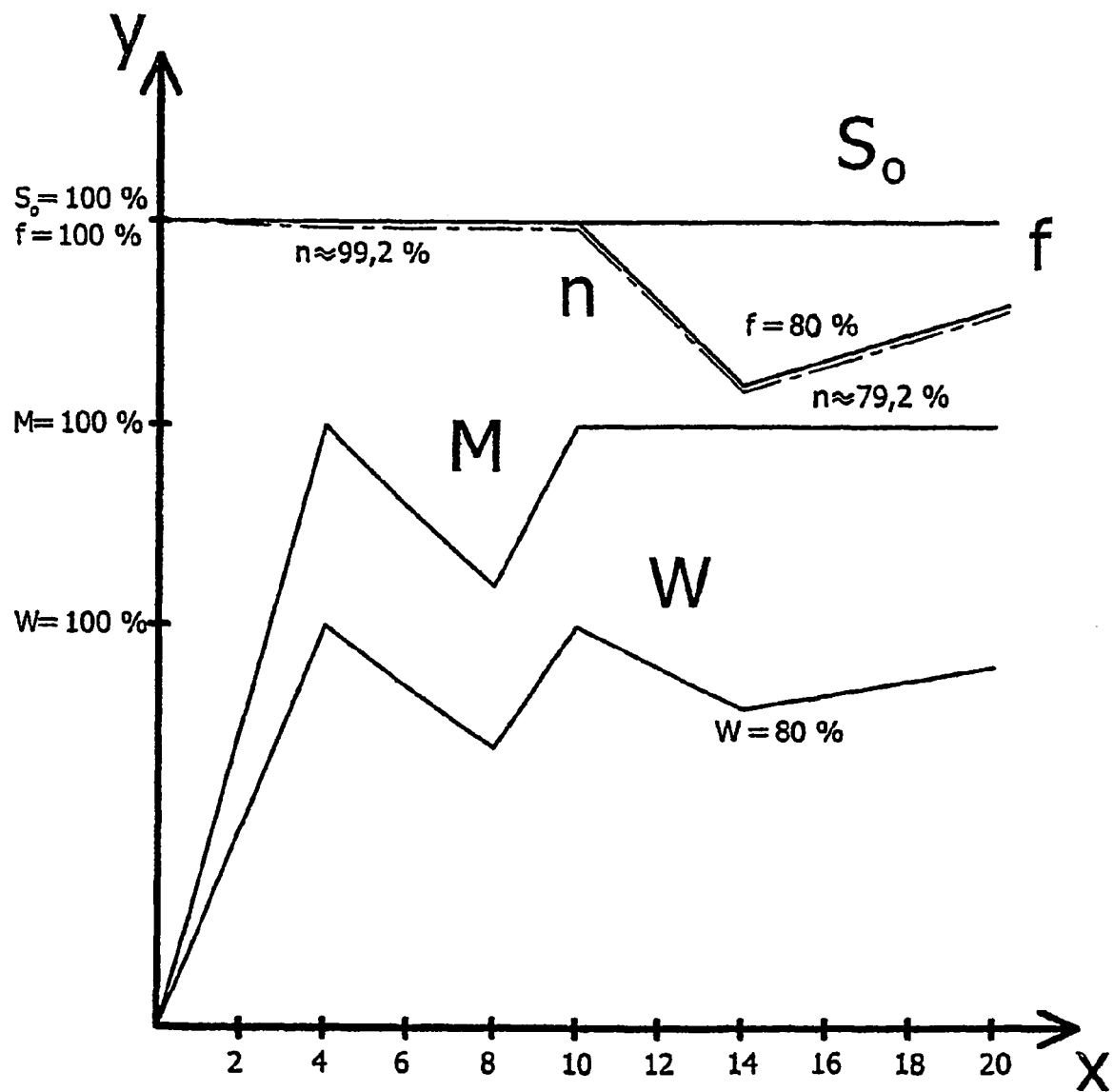

FIG. 4 also shows the operation of a chipper in accordance with the present invention as a diagram.

Figure 5:
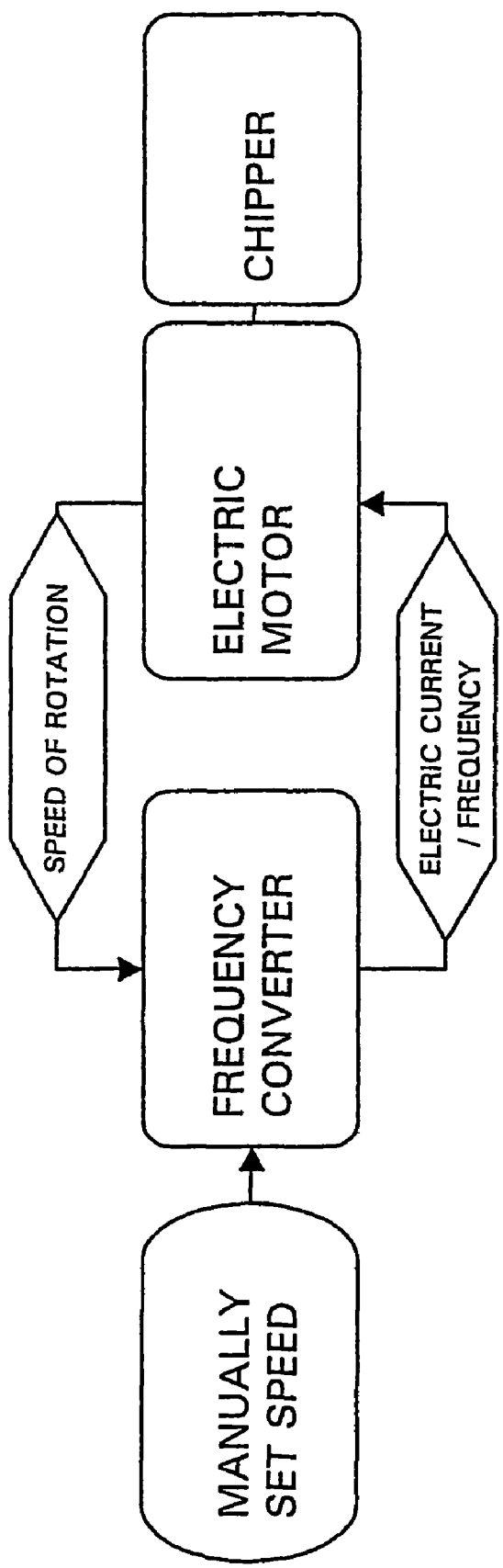

FIG. 5 shows as a schematic drawing the control operation of a chipper in accordance with the present invention.

Figure 1:
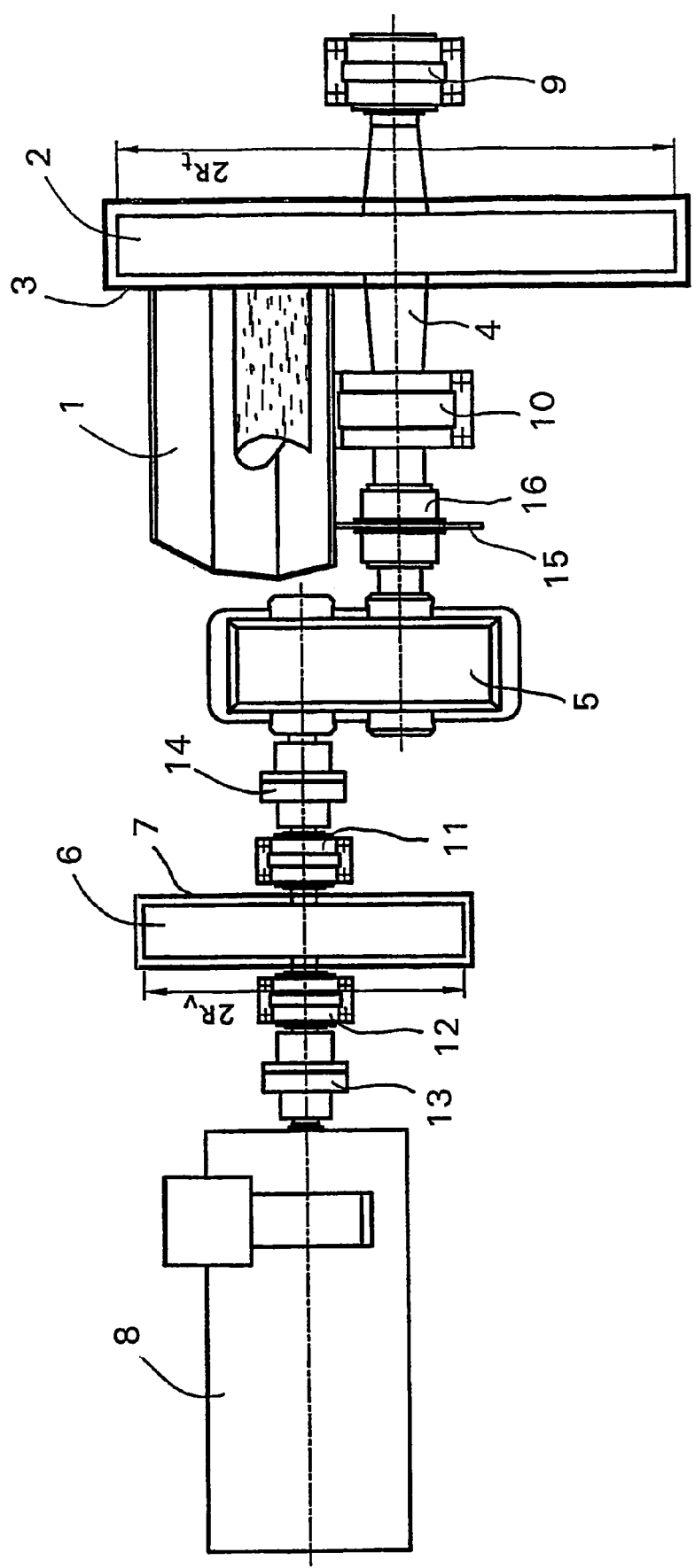

The disc chipper in accordance with the present invention comprises, as shown in FIG. 1, a feeding chute 1 for logs, a chipping disc 2, a cover 3 for the chipping disc, a shaft 4, a gear 5, a flywheel 6 and its casing 7 and an electric motor 8. The shaft 4 of the chipping disc is equipped with two bearings 9 and 10. Also supporting the flywheel there are two bearings 11 and 12. Between the electric motor and the flywheel and between the flywheel and the gear respectively there is a coupling 13, 14. Between the chipping disc and the flywheel there is a coupling 16 equipped with a brake disc 15.

Radius of the chipping disc 2 is $R_t$ and the mass is $G_t$. Radius of the flywheel 6 is $R_v$, and its mass is $G_v$. The respective inertial moments with a reasonable accuracy are (effects of chip apertures and other holes are not taken into consideration):

Chipping disc $J_t = \frac{1}{2} G_t (R_t)^2$ and

Flywheel $J_v = \frac{1}{2} G_v (R_v)^2$.

The following clause is valid between the inertial moments, taken into consideration the transmission ratio i of the gear 5:

$$kJ_t = i^2 J_v$$

In the method in accordance with the invention the value of k=2 . . . 3.

A disc chipper in accordance with the invention will be designed by taken on a chipping line with a chipping capacity of 200 m³/h. The production peak is 300 m³/h. The dimension of the biggest log is D=800 mm and the length of the same is 4.5 m, whereby the volume of the log is about 2.25 m³. The capacity of the electric motor T=600 kW, 1500 r/min.

The normal speed of rotation of the chipper $n_n$=300 r/min.

The inertial moment of the chipping disc $J_t$=14000 kgm².

The lowest permissible speed of rotation $n_a$ for the chipper is about 200 r/min.

Chipping time t of a log having a length of 4.5 m is about 3 s.

Chipping energy required for the log is $E_p$=4.5 kWh

Chipping energy $E_m$ given by the motor (T=600 kW) during 3 seconds:

$$E_m = Tt = 600 \text{ kW} * 3/3600 \text{ h} = 0.5 \text{ kWh}$$

Energy $W_h$ given by the chipping disc and the flywheel when the speed of rotation drops from value $n_n$ to value $n_a$:

$$W_h = E_p - E_m$$
$$= 4,5 \text{ kWh} - 0,5 \text{ kWh} = 4,0 \text{ kWh} = 1440000 \text{ Nm}.$$

The total kinetic energy of the chipping disc and the flywheel with a speed of rotation of $n_n$ is $$W_k = \frac{1}{2}J(\omega_n)^2$$

And with a speed of rotation of $n_a$ $$W_a = \frac{1}{2}J(\omega_a)^2.$$

Relations between the angular speeds and the speeds of rotation are the same, that is $$\omega_a = \frac{2}{3}\omega_n$$

For calculating the total kinetic energy, the following formula can be written:

$$W_h = W_k - W_a$$
$$= \frac{1}{2}J(\omega_n)^2 - \frac{1}{2}J\left(\frac{2}{3}\omega_n\right)^2 = \frac{5}{9}\frac{1}{2}J(\omega_n)^2 = \frac{5}{9}W_k$$
$$\Rightarrow W_k = \frac{9}{5}W_h = 26000000 \text{ Nm}.$$

The total inertial moment J on the main shaft can be calculated from equation $$W_k = \frac{1}{2}J(2\pi n_n/60)^2$$

$$\Rightarrow J = 52\,740 \text{ kgm}^2.$$

The inertial moment of the flywheel $$J_v = J - J_t$$
$$= 38740 \text{ kgm}^2.$$

When locating the flywheel on the other side of the gear (transmission rate i=5:1) the required inertial moment can be calculated from equation:

$$W_v = W_{v2}$$
$$\Rightarrow \frac{1}{2}J_v(\omega_n)^2 = \frac{1}{2}J_{v2}(\omega_2)^2$$
$$\Rightarrow J_{v2} = J_v/25 = 1550 \text{ kgm}^2$$

When the diameter of the flywheel is chosen to be $2R_2$=1600 mm, the mass will be $G_2$=4844 kg.

This mass will be reached with a flywheel made of steel and having a thickness of 300 mm.

The start-up time of the chipper without load is at least 90 seconds. With present frequency converters it is possible to choose an adequate starting time without requiring the design power of the motor.

Figure 2:
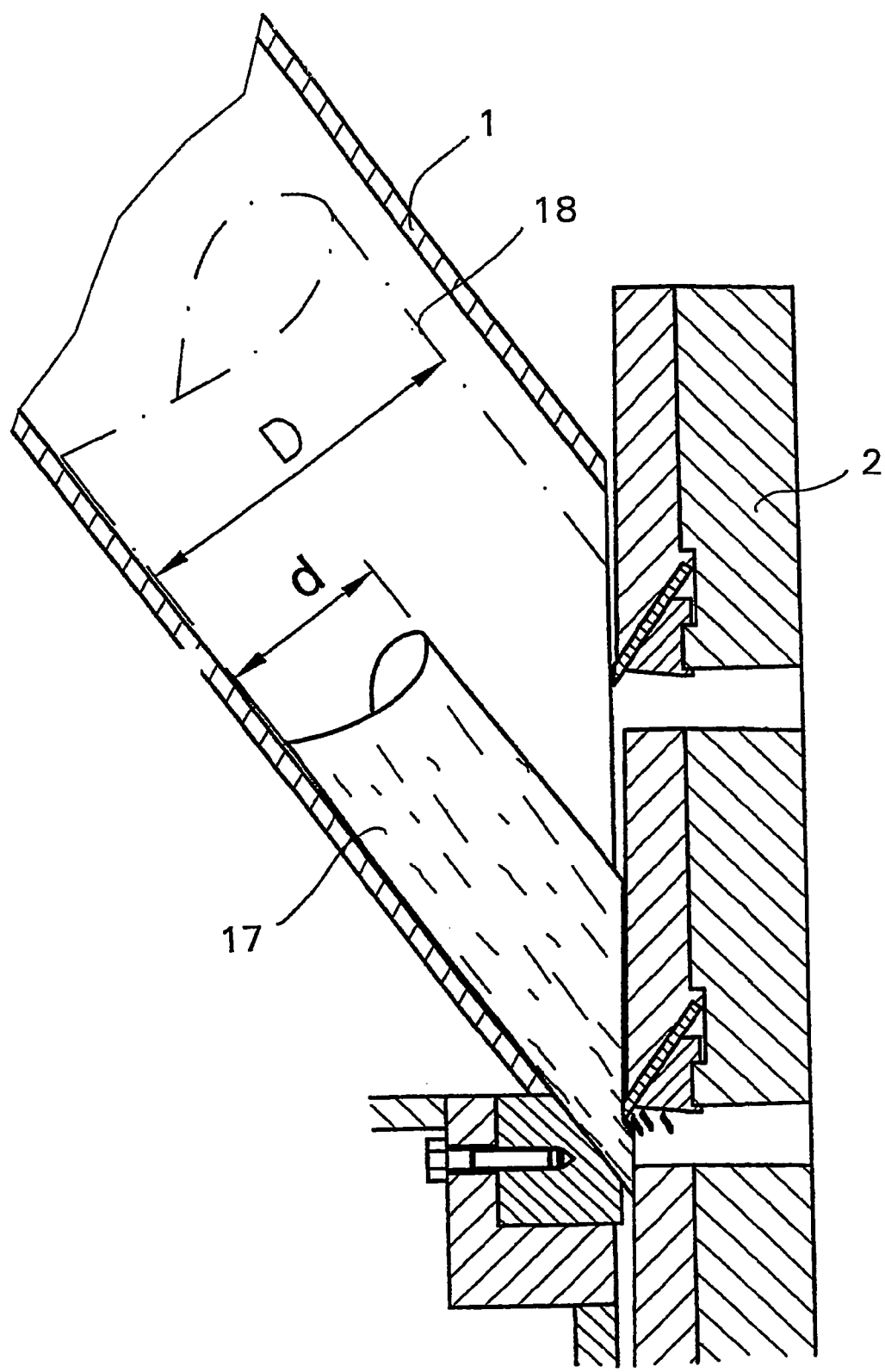
FIG. 2 shows as a side view the feeding of logs into the disc chipper.

FIG. 2 shows the diameter d of a single log 17 to be fed into the chipper, giving the biggest continuous chipping output of the chipper Q=300 compact-m³/h=0,083 m³/s. With a feeding speed v=1.5 m/s the diameter d can be calculated $$Q = (\pi/4)d^2 v$$
$$\Rightarrow d = 266 \text{ mm}$$

The chipping power is directly proportional to the chipping area and thus to the square of the log diameter. When the diameter of a big log 18 is D=2d=532 mm, it requires a chipping power $2^2$ T=4*600 kW=2400 kW. A usual single pulp log with a diameter of 133 mm requires a power of 150 kW only. Thus, the chipping power required by a normal production (2–3 logs) ranges from 300 to 450 kW.

Figure 3:
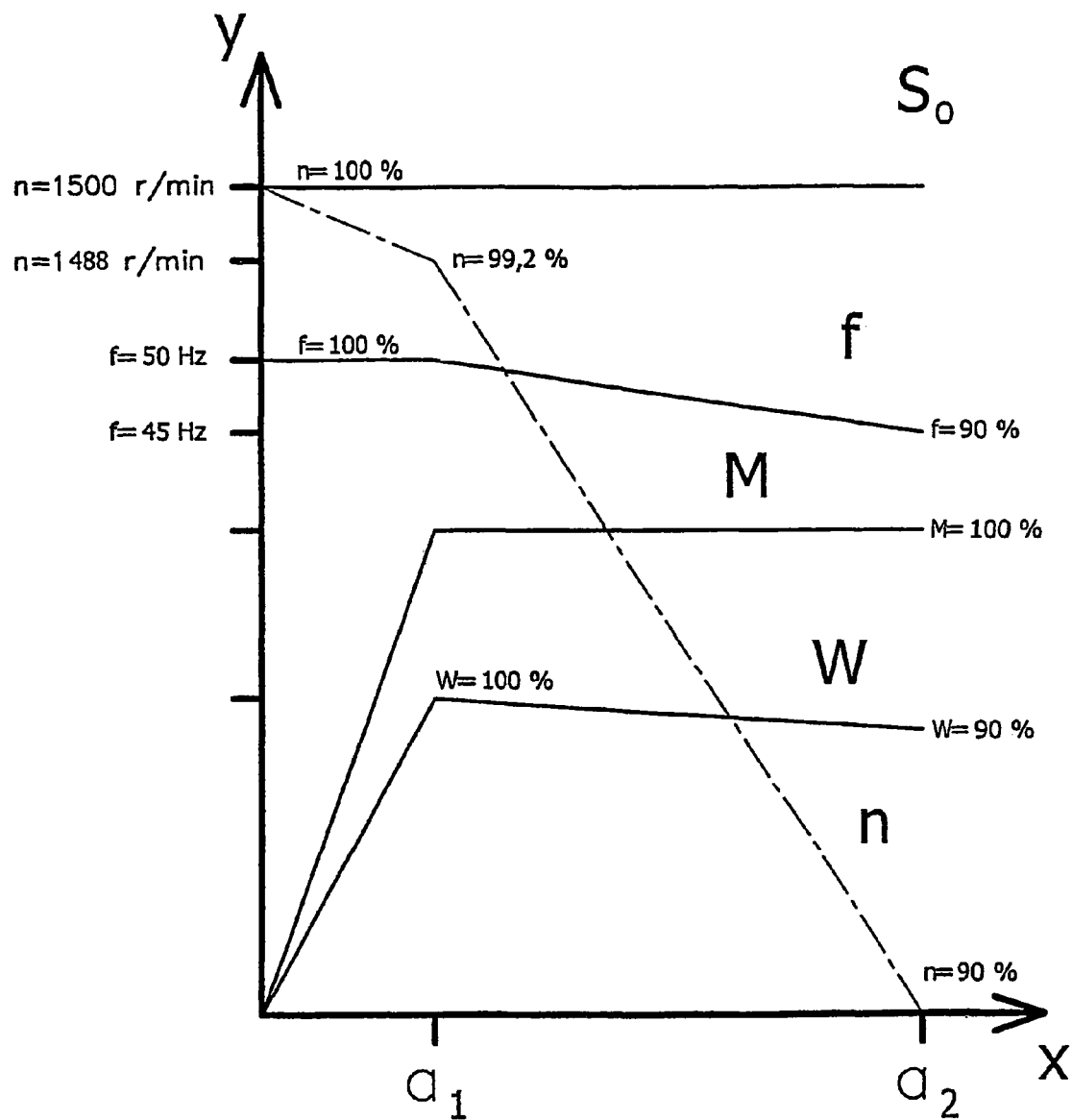
FIG. 3 shows the operation of a chipper in accordance with the present invention as a diagram.

The diagram of FIG. 3 shows operations in accordance with the present invention. Time used is shown starting from the origin parallel with the x-axis and as proportional values parallel with the y-axis are shown the power W of the electric motor, the torque M given by the motor, the frequency f given by the frequency converter and as a part of the scale, the speed of rotation n. The upper line describes the predetermined set value $S_o$ of the speed of rotation, which will be changed according to the change of the wanted speed of rotation of the chipper.

The process starts at origin by loading the chipper evenly until moment $a_1$, whereby the apparatus has decelerated by 0.8% from the synchronous speed of rotation. For example, when the synchronous speed of rotation is 1500 r/min, the typical speed of rotation giving the nominal power of the motor is 1488 r/min with a big motor. For that time the frequency converter supplies nominal current with a frequency of 50 Hz, whereby the amperage increases up to the level of 100% and also the torque M of the motor reaches the level of 100%. The above-mentioned deceleration gives about 1.6% of the total kinetic energy, which in the case in accordance with the described embodiment of the invention is 416 000 Nm. This energy is enough for chipping wood of 0.115 m³ with a flywheel referred to above. Without a flywheel the amount of released energy remains very small.

In the example of FIG. 3, the load of the chipper increases in the period of time from $a_1$ to $a_2$, whereby the speed of rotation of the chipper is on the level of 90% and accordingly, the frequency f and the power W given by the motor are decreased in accordance with the invention. The torque M from the motor stays on the same level during the period of time from $a_1$ to $a_2$.

FIG. 4 has been drafted based on FIG. 3, but there the X-axis describes time in seconds. At the beginning the chipper is loaded for 4 seconds so that the power W and torque M increase up to the level of 100%. Thereby the speed of rotation n of the chipper decreases from the set value $S_o$ for about 0.8%. Linear deceleration as shown in FIG. 4 is very exceptional, because the power given by the motor increases as a result of the deceleration. According to FIG. 4, the load of the chipper falls in the period of time from 4 to 8 seconds, and the torque M and the power W decrease.

In the period of time from 8 to 10 seconds the load is again increased, growing further in the period of time from 10 to 14 seconds. There the speed of rotation n of the chipper decreases below 80% of the predetermined set value $S_o$ and the frequency converter gives then 80% of the desired frequency. Thus, the speed of rotation n with a slip of 0.8% is about 79.2% of the desired value. Motor power W also decreases to level 80%. The torque coming to the apparatus remains constant so long that the slip of the motor exceeds its specific structural power slip 0.8%.

FIG. 5 shows a control flow chart of a system with a chipper, an electric motor and a frequency converter. According to traditional electrical engineering the frequency converter receives the information of the speed of rotation of the motor via tachometer, and the frequency converter decreases the frequency supplied to the motor when the slip of the motor exceeds the set value $S_o$. Alternatively a new more developed frequency converter can be constructed so that when the supplied current reaches the set level, the frequency converter decreases the frequency so that the outgoing current to the motor keeps to the set level taking into account its speed of rotation and its original set level.

The above-mentioned example of a chipper drive brings along the following advantages:
- the electric network will not be overloaded (easy start-up, variations of voltage will be eliminated),
- smaller drive motor,
- speed regulation and control of the chipping quality with a reasonable price,
- automated control of chipping quality enabled.

The advantages of the present invention come out best in cases, where the adjustment of the chipping speed is of advantage. A prominent additional benefit can be achieved with chippers having a small chipping capacity and a need to chip big butt logs.

Driving the chipper in accordance with the present invention can also be applied to chippers without a separate flywheel. Equally the invention can be used in crushers with high speed of rotation having temporary peak loads. In those cases only a part of the advantages of the invention can be achieved. Because in the above-mentioned cases the inertial moment of the mass of the apparatus is not increased, the provisions to utilize it are considerably smaller. An advantage, however, is the smaller loading of the electric network in connection with the start-up and overloads. With fast-speed crushers rotating with a speed of rotation of a short circuit motor the mass of the rotor can easily be increased by means of a flywheel that provides the crusher with better features in an application in accordance with the invention.

When the apparatus has passed a peak load situation, the control devices bring again the apparatus to its nominal working conditions.

The invention claimed is:

1. A wood chipping apparatus the main parts thereof comprising a chipping disc and an electric short circuit motor journaled to a common axle for common rotation motion with a prominent speed of rotation at a nominal current frequency and a mass inertial moment, said electric short circuit motor having a nominal load value and means to ascertain the corresponding nominal current, the apparatus further comprising a frequency converter connected to the current circuit of said electric short circuit motor, wherein the apparatus includes electronic means for receiving the value of an actual rotational speed of said main parts, said electronic means being operationally connected to said frequency converter, said frequency converter being arranged to decrease the frequency of the current of the motor when detecting a decreasing rotational speed at said nominal current of the motor, for releasing thereby kinetic energy of the rotating main parts, and to reset the frequency at a decreasing current of the motor.

2. A wood chipping apparatus in accordance with claim 1, including a flywheel on said common axle for increasing the kinetic energy of the apparatus.

3. A wood chipping apparatus in accordance with claim 1, wherein the frequency converter is arranged to control the frequency of the motor current to keep the rotational speed of the motor within a slip interval characteristic to the short circuit motor applied.

4. A crushing apparatus the main parts thereof comprising a chipping disc and an electric short circuit motor journaled to a common axle for common rotation motion with a prominent speed of rotation at a nominal current frequency and a mass inertial moment, said electric short circuit motor having a nominal load value and means to ascertain the corresponding nominal current, the apparatus further comprising a frequency converter connected to the current circuit of said electric short circuit motor, wherein the apparatus includes electronic means for receiving the value of an actual rotational speed of said main parts, said electronic means being operationally connected to said frequency converter, said frequency converter being arranged to decrease the frequency of the current of the motor when detecting a decreasing rotational speed at said nominal current of the motor, for releasing thereby kinetic energy of the rotating main parts, and to reset the frequency at a decreasing current of the motor.

5. A crushing apparatus in accordance with claim 4, including a flywheel on said common axle for increasing the kinetic energy of the apparatus.

6. A crushing apparatus in accordance with claim 4, wherein the frequency converter is arranged to control the frequency of the motor current to keep the rotational speed of the motor within a slip interval characteristic to the short circuit motor applied.

* * * * *